(12) United States Patent
Tsirangelos et al.

(10) Patent No.: US 8,342,855 B2
(45) Date of Patent: Jan. 1, 2013

(54) FLEXIBLE POWER RACEWAY

(75) Inventors: Dimitrios Tsirangelos, Hamburg (DE);
Alexis Synodinos, Courbevole (FR)

(73) Assignees: Airbus Deutschland GmbH, Hamburg (DE); Connecteurs Electriques Deutsch, Evreux (FR)

( * ) Notice: Subject to any disclaimer, the term of this patent is extended or adjusted under 35 U.S.C. 154(b) by 850 days.

(21) Appl. No.: 11/993,401

(22) PCT Filed: Jun. 20, 2006

(86) PCT No.: PCT/EP2006/005914
§ 371 (c)(1),
(2), (4) Date: Feb. 29, 2008

(87) PCT Pub. No.: WO2006/136376
PCT Pub. Date: Dec. 28, 2006

(65) Prior Publication Data
US 2010/0155530 A1 Jun. 24, 2010
US 2011/0163203 A2 Jul. 7, 2011

Related U.S. Application Data

(60) Provisional application No. 60/692,904, filed on Jun. 22, 2005.

(30) Foreign Application Priority Data

Jun. 22, 2005 (EP) .................................. 05013505

(51) Int. Cl.
*H01R 41/00* (2006.01)
*H01R 3/00* (2006.01)
(52) U.S. Cl. ........................................ 439/32; 439/162

(58) Field of Classification Search ............... 244/118.6;
439/32, 34, 162
See application file for complete search history.

(56) References Cited

U.S. PATENT DOCUMENTS

| 3,873,177 | A | | 3/1975 | Ross |
| 4,370,008 | A | * | 1/1983 | Haworth et al. ............. 439/165 |
| 5,203,713 | A | * | 4/1993 | French et al. ................ 439/215 |
| 5,582,522 | A | * | 12/1996 | Johnson ....................... 439/214 |
| 5,734,176 | A | * | 3/1998 | Oldfield .......................... 257/48 |
| 6,077,086 | A | * | 6/2000 | LaRoche ......................... 439/32 |
| 6,267,430 | B1 | * | 7/2001 | Cresseaux .................. 296/65.13 |
| 6,445,270 | B1 | * | 9/2002 | Ogasawara ................... 336/182 |
| 6,619,588 | B2 | | 9/2003 | Lambiaso |
| 6,972,367 | B2 | * | 12/2005 | Federspiel et al. ........... 174/481 |
| 7,021,961 | B1 | * | 4/2006 | Soderholm ................... 439/505 |

(Continued)

FOREIGN PATENT DOCUMENTS
JP 61-500486 3/1986
(Continued)

OTHER PUBLICATIONS

European Search Report, dated Nov. 23, 2005, transmitted on Dec. 1, 2005, of Application No. EP 05 01 3505, 3 pages.

(Continued)

*Primary Examiner* — Renee Luebke
*Assistant Examiner* — Larisa Tsukerman
(74) *Attorney, Agent, or Firm* — Christopher Paradies; Fowler White Boggs P.A.

(57) ABSTRACT

A connection system for cables comprises a raceway adapted to cover the cable and a raceway outlet element connectable to the raceway. The raceway outlet element includes a first connection element for connecting the cable to second connection element.

19 Claims, 21 Drawing Sheets

U.S. PATENT DOCUMENTS

| | | | |
|---|---|---|---|
| 7,063,562 B2* | 6/2006 | Henley et al. | 439/502 |
| 7,172,155 B2* | 2/2007 | Feist et al. | 244/118.6 |
| 7,185,850 B2* | 3/2007 | Callahan et al. | 244/118.6 |
| 7,207,523 B2* | 4/2007 | Callahan et al. | 244/118.6 |
| 7,220,128 B1* | 5/2007 | Hicks | 439/32 |
| 7,589,286 B2* | 9/2009 | VanderVelde et al. | 174/480 |
| 2002/0070314 A1* | 6/2002 | Schmidt-Schaeffer | 244/118.6 |
| 2002/0195523 A1* | 12/2002 | Cawley | 244/118.6 |
| 2003/0042360 A1 | 3/2003 | Lambiaso | |
| 2004/0129445 A1 | 7/2004 | Winkelbach et al. | |
| 2004/0195446 A1* | 10/2004 | Smallhorn | 244/118.5 |
| 2006/0097109 A1* | 5/2006 | Laib et al. | 244/118.6 |
| 2006/0202084 A1* | 9/2006 | Smallhorn | 244/118.5 |

FOREIGN PATENT DOCUMENTS

| | | |
|---|---|---|
| JP | 01-126121 | 5/1989 |
| JP | 02-114082 | 4/1990 |
| JP | 04-072812 | 3/1992 |
| JP | 5-92981 U | 12/1993 |
| JP | 07-143638 | 6/1995 |
| JP | 9-247828 A | 9/1997 |
| JP | 10-201041 | 7/1998 |
| JP | 11-054200 | 2/1999 |
| JP | 2000-220611 | 8/2000 |
| JP | 2001-230017 | 8/2001 |
| JP | 2001-253395 | 9/2001 |
| JP | 2004-56938 A | 2/2004 |
| JP | 2004-355568 A | 12/2004 |
| RU | 2003110426 A | 8/2004 |

OTHER PUBLICATIONS

Japanese Office Action, Notice of Reasons for Rejection, Japanese Patent Application No. 2008-517400, and its English language translation, 12 pages.

Japanese Office Action for Japanese Patent Application No. 2008-517400, dated Jun. 12, 2012, 2 pages.

* cited by examiner

FLEXIBLE POWER RACEWAY

REFERENCE TO RELATED APPLICATIONS

This application claims the benefit of the filing date of the European Patent Application No. 05 013 505.2 filed Jun. 22, 2005, as well as of U.S. Provisional Application No. 60/692,904 filed Jun. 22, 2005, the disclosure of which is hereby incorporated herein by reference.

FIELD OF THE INVENTION

The field relates to a connecting device and a connecting method for cables, to a seat, to the use of a connection device in an aircraft, and to a means of transportation.

BACKGROUND OF THE INVENTION

Cabin layouts for passenger aircrafts comprise usually three different types: first class, business class and economy class. In order to optimize the utilization of the capacity the aircraft, companies wish to change the cabin layout depending on how many reservations for each class are available. In order to receive a profitable and short reconfiguration time, the aircraft companies need to change the passenger seat configuration very quickly.

Because modern passenger seats are equipped with several electronic devices, it is not enough to change just the seat position, but also the connection of the electronic data and power cables. According to the references, the cables of the seats are embedded in so-called raceways. Wherever a cable should be connected to a seat, the raceway provides a raceway outlet wherein the cable may exit and may be connected to an electronic device, for instance in a seat. If an aircraft company needs to change the space between each seat, it may be necessary to provide new raceways to position the exits for the cables on the right position, usually close to the seat leg. As a result for this complicated system, the duration to reconfigure the cabin layout is quite long and complicated.

SUMMARY OF THE INVENTION

Among other things, it may be an object to provide a flexible connection between cables.

This object may be solved by a connection device, by a seat, by a connecting method, by the use of the connection device in an aircraft, and by a means of transport with the features according to the independent claims.

According to an embodiment, a connection device comprising a raceway outlet element connectable to a raceway for receiving cables, wherein the raceway outlet element includes a first connection element for connecting the cable to a second connection element which is designed to correspond to the first connection element.

According to a further embodiment, a seat is provided comprising a second connection element which is designed to correspond to and to be connected to a first connection element of a connection device having the above-mentioned features.

According to a further embodiment, a connection device having the above-mentioned features and/or a seat having the above-mentioned features is or are used in an aircraft.

For aircraft companies, it may be important to change the seat configurations in a fast way, in order to change, for instance, from business class cabin layout to economy class cabin layout. Because modern aircraft seats may be equipped with several electronic devices, it may be not enough to change just the seat position. Because the seats may need to be fed by power and data connections, it may also be important to provide flexible and adjustable feed lines. Therefore, the cables are embedded in raceways on the floor and may be changed in their length. With the connection system according to an embodiment, at any position of the seats, seats may be connected with the cable interface of the raceway. Therefore, lead time may be minimized by a cabin layout reconfiguration so that, for example, a complete reconfiguration of the aircraft seat positions may be adapted in one night or less. With this fast reconfiguration time of the cabin layout, the efficiency of an aircraft may be increased.

According to a further embodiment, the raceway outlet element includes a third connection element for connecting a second cable. Therefore, further cables respectively may be added to the connection devices may be added so that every desirable length may be available and any amount of connection devices may be added to one connection device.

According to a further embodiment, the raceway comprises an upper and a bottom part, wherein the bottom part is connected with a floor and the upper part is connected to the bottom part, wherein the cables are routed in the raceway parts. With this two-part raceway, an easy installation of a raceway system may occur. First of all, the bottom parts may be connected to the floor and the cables may be embedded in a fast and flexible way. With the upper part, the raceway may be closed similarly like a tube so that the cables are saved and hidden in the raceway to be prevented against damage. Additionally, the modular two-part raceway may be very flexible because further cables may be inserted easily at any time.

According to a further embodiment, the length of the raceway is adjustable. Therewith, the cables may be flexibly adjusted in any preferable length so that the cables may be protected and embedded by the raceway.

According to a further embodiment, the upper part of the raceway is adjustable by sliding the upper part on the bottom part of the raceway. With this flexible raceway system, the cables may be protected at any length of the raceway.

According to a further embodiment, in order to adjust a defined and predetermined length, the upper part, one of the upper parts and/or the bottom part at includes a scale. According to a further preferred embodiment, the upper part consist of at least two parts, wherein the parts may be moveable telescopically, such as a telescopic tube.

According to a further embodiment, the second connection element is integrated in a seat, substantially in the seat leg.

According to a further embodiment, the raceway outlet element is fixed in floor tracks. Floor tracks may be usually equipped with little fixing holes, wherein the raceway outlet element may be plugged in at a defined position of the aircraft. Therefore, it may be easy and fast to selectively fix the cable interface or especially the raceway outlet element at a desired position of the aircraft floor.

In a further embodiment, the raceway outlet element is fixed in seat track holes. In modern aircraft, these passenger seats may be usually fixed in so-called seat track holes that may be positioned longitudinal to the aircraft fuselage. With an embodiment, these passenger seat track holes in order to fix also the raceway outlet element may be used. Therefore, the raceway outlet element may be fixed very easily in any position of the aircraft without installing further fixing elements.

According to a further embodiment, the cables may be selected from the group consisting of electronic cables, power cables, data cables, optical fibers and light conductors. However, the connection element according to an embodiment may be also configured to receive other components than cables.

The first and second connection elements may be realized as a plug and a bushing. The first and second connection elements may be realized as a male and a female connector matched to one another. Thus, the first and second connection elements may be any pair of connectors which allow to electrically connect cables coupled to the first connection element to cables coupled to the second connection element.

According to a further embodiment, the first and second connection elements include a press-self-cleaning connection. This kind of connection element is characterized by a non-plugging connection, that means that both connection partners may be in slidable contact and not fixed by a plug. Therefore, the contacts may grind against each other, whereby they may clean themselves automatically because of vibrations or because of changing the connection device position. Today, it may be a problem especially in aircrafts, such of as defilement of the contacts in aircraft seats, for instance such as dirt or soft drinks such as Coke,®[1] the electronic connections may be often disconnected. With this further embodiment the self-cleaning effect of this connection may improve the electronic connection quality.

[1] Coke® is a registered trademark of the Coca-Cola Corporation.

According to a further embodiment, the raceway outlet element comprises an induction connector such as an Indux connector of the company Deutsch, which is an example of an electric connector. Electric connectors, in one example, are made out of housing and the contacts. Other connectors use pin-socket contacts. The flexible raceway may use Indux connectors, or face-to-face contacts. With electrical connectors, the electronic contacts are only in contact with each other for providing electronic conductivity. Accordingly, for every connection, there is a self-cleaning mechanism that cleans the contacts automatically because recesses, for example, sockets are not necessary and no dirt particles would close the connector sockets, which provides an advantage. In mechanical connectors, such as Pin-Socket, the housing of the connector provides a mechanical connection. Nevertheless, the raceway may use either type of contact, an electric connector (for example, an Indux connector) or a mechanical connector (for example, a pin-socket type connector.)

This connector provides a cable interface with which two cables may be connected in a very easy and fast way by using a plug-and-play concept.

According to a further embodiment, the raceway outlet element comprises a deadphase insert. This so-called deadphase insert controls the feeding lines to the seats. In an aircraft, for instance, it may be important to control the power load distribution. Therefore, every seat may be connected with its own phase. By adding the deadphase insert to the raceway outlet element, a determined phase is connected to the seat. For instance, the first seat row is connected with Phase A, the second seat row with Phase B etc., so that a constant load distribution for every seat may be provided.

According to a further embodiment, the raceway and the raceway outlet element may be integrally formed, that is to say are manufactured as a single member. With this embodiment, less parts may be necessary so that costs and weight may be reduced.

According to a further embodiment, a cable is provided, including a memory lead. Therewith the cable may be stretched in each desirable position, whereby the cable maintains this position without applying force trying to draw the cable back in the previous position. On the other side by pushing the cable back to the first position, the cable may recapture the original position or the original shape. This kind of cable may be called memory-snake-cable.

According to a further embodiment, a method for connecting cables is created, wherein the method comprises, a step of providing a raceway, a step of installing a raceway to receive the cables, and connecting a first connection element of a raceway outlet element connected to the raceway to a second connection element which is designed to correspond to the first connection element, wherein the first connection element is connected to the cables.

According to a further embodiment of the method, the step of providing a raceway includes a providing a raceway with an upper part and a bottom part, and the step of installing the raceway includes the steps of connecting a raceway bottom part to the floor, further embedding the cables in the bottom part, and finally connecting the upper part to the bottom part, wherein the cables may be embedded in both raceway parts.

According to a further embodiment of the method, the method comprises a further step of connecting the raceway outlet element by a third connection element to a second cable. Therefore, a desirable amount of further connection elements may be adaptable.

According to a further embodiment of the method, the method comprises a further step of adjusting the length of the raceway. Therefore, the raceway may be adjusted very flexibly at every position of the aircraft. By adding the raceway outlet element to the end of the raceway, the cable interface may be adjusted flexibly.

According to a further embodiment of the method, the method comprises a further step of adjusting the upper parts of the raceway by sliding the upper parts on the bottom part of the raceway. With this embodiment of the method, the length of the raceway may be adjusted in an easy and fast way.

According to a further embodiment of the method, the method comprises a further step of connecting a second connecting means to the first connecting means. After adjusting the raceway outlet element including the first connection means to a predetermined position, a second connecting means may be connected in an easy way, for instance with the plug and play method for instance by using a moveable press-self-cleaning connection method.

According to a further embodiment of the method, the method comprises a further step of connecting the second connecting means to the first connecting means automatically. With this embodiment of the method, the connection means may be designed to be connected automatically, such as plug and play or click connections. With this embodiment, installation and connection of the cables may be easy and may be accomplished fast.

According to a further embodiment of the present method, the method comprises a further step of integrating the second connecting means in a seat, wherein by installing the seat, the first and second connecting means may be connected automatically. Especially in order to change the seat configurations of aircraft, it may be necessary to configure the seat positions very quickly to keep the turnaround time of aircraft very short. With the present method, the passenger seats may be reconfigured by disconnecting the second connecting means from the first connecting means, changing the position of the passenger seats and then, after configuration, the raceway outlet element, reconnect the second and the first connecting means. The connection means may be therefore designed to connect themselves automatically so that reconfiguration of the cabin layouts may be accomplished in a fast and easy way.

According to a further embodiment of the present method, the method comprises a further step of using a press-selfcleaning connection for connecting the first and second connection elements. Therewith the contacts always grind against each other, whereby they may clean themselves automatically because of vibrations or because of changing the connection device position.

According to a further embodiment of the method, the method comprises a further step of covering the raceway and/or the raceway outlet element by covering means. Because the raceway according to an embodiment may be kept very small, it may be easy to cover the raceway including the cables, for instance, with a fuselage floor, such as carpets. Therefore, the cables may not disturb the passengers and may not be damaged by the passengers.

According to a further embodiment of the present method, the method comprises a further step of fixing the raceway outlet element into floor tracks. In aircraft, floor tracks usually may be fixed on the fuselage floor to fix several devices. Floor tracks provide fixing holes, wherein also raceway outlet elements may be plugged in and therewith fixed in a very easy and fast way with the fuselage floor. Because the floor tracks were usually positioned longitudinal to the fuselage, the raceway outlet element or the raceway may be fixed in every desired position in the aircraft.

According to a further embodiment of the method, the method comprises a further step of fixing the raceway outlet element in seat track holes. With the present embodiment, the raceway outlet elements or/and the raceway seat track holes may be fixed, such that additional fixing means may be dispensible. Therewith, additional costs or additional reconfiguration time may be prevented.

According to a further embodiment of the method, the method comprises a further step of placing a deadphase insert on the raceway outlet element. Therewith the connection to certain predetermined cables may be controlled easily.

According to a further embodiment of the method, the method comprises a further step of adjusting the length of the raceway automatically. Therewith, for instance with simple or small adjusting motors, the raceways may be adjusted to a defined position. The control of the steering of the raceways may be controlled for instance by the board computer.

Further embodiments provide a means of transportation comprising a connection system for cables having the above-mentioned features.

In a further embodiment, the means of transportation is an aircraft.

In a further embodiment, a connection system for cables having the above-mentioned features is used in an aircraft.

BRIEF DESCRIPTION OF THE FIGURES

In the following, embodiments will be specified for further explanation and for better understanding with reference to the attached drawings.

DETAILED DESCRIPTION

Figure 1:
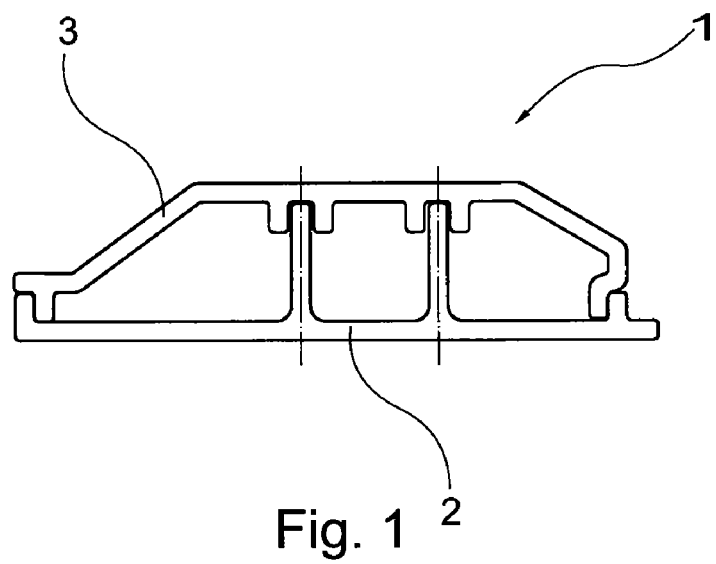
FIG. 1 shows a schematic view of a raceway

The examples described and drawings rendered are illustrative and are not to be read as limiting the scope of the invention as it is defined by the appended claims.

Similar or relating components in the several figures are provided with the same reference numerals.

The views in the figures are schematic and not full-scaled.

FIG. 1 shows a conventional raceway 1. The raceway of FIG. 1 comprises a bottom part 2 and an upper part 3 which may be fixed together and wherein several cables may be embedded. With the raceway 1, it may not be possible to adjust the length of the raceway 1 flexibly, because the raceway outlets may not be changed.

Figure 2:
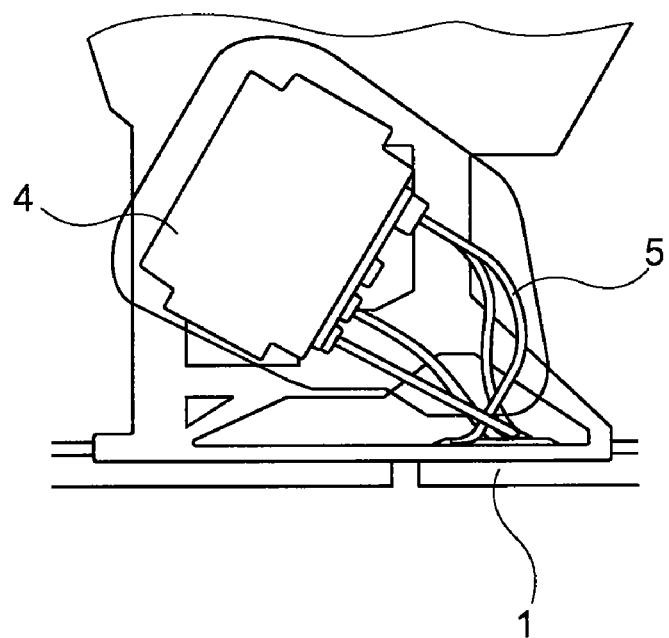
FIG. 2 shows a schematic view of a connection of an electronic device with the cables using the raceway of FIG. 1.

FIG. 2 shows a conventional connection system, wherein an electronic device 4 is connected by means of several cables 5 that may be embedded in a raceway 1. As shown in FIG. 2, the cables 5 leave the raceway 1 on a defined position in order to connect the electronic device 4. Changing the position of the electronic device 4, new raceways 1 with new positioned raceway outlets have to be installed. The result of a reconfiguration of, for instance, passenger seats may take long time and may be expensive because new raceways have to be designed manually by an engineer for a certain length.

Figure 3:
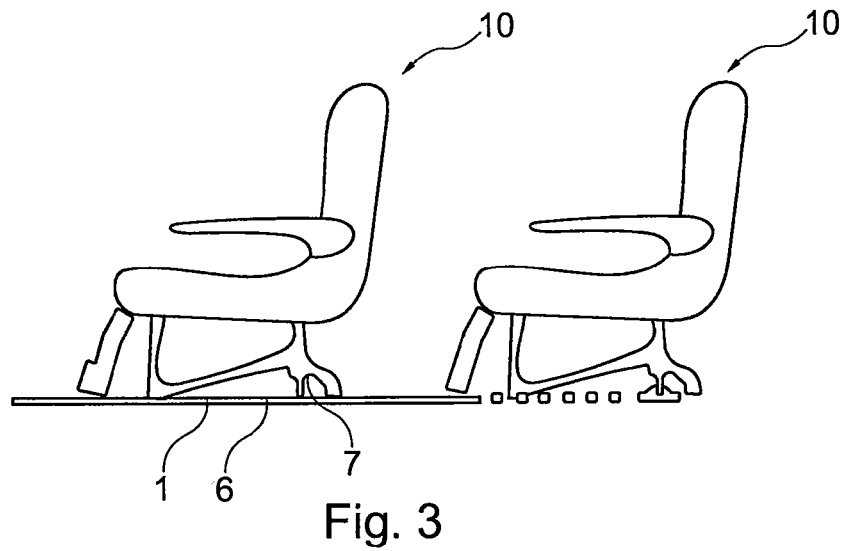
FIG. 3 shows an aircraft passenger seat connected with the connection system according to an embodiment.

FIG. 3 shows an arrangement of seats 10 comprising a connection system according to one example. Between each seat 10, a raceway 1 embedding the feeding cables for the passenger seats 10 is placed, wherein at each end, a raceway outlet element 6 is placed for connecting cables with electrical components 4 of the passenger seat 10 4. A seat component 7 includes a structure and connector means, for example.

By using a cable interface with a first connecting means 12 and a second connecting means 13 (e.g. FIGS. 17-21), it is not necessary to connect the cables 5 directly to the electronic devices 4 and positions may be changed fast and flexibly.

Figure 4:
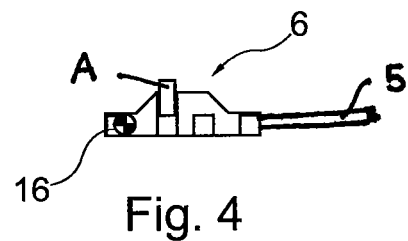
FIG. 4 shows a schematic view of a raceway outlet element according to an embodiment.

FIG. 4 illustrates one example of a raceway outlet element 6 electrically coupled with cables 5. The raceway outlet element 6 may be exactly adjusted along a raceway 1 and the position may be defined by a reference point 16, as illustrated in FIG. 6, for example.

Figure 5:
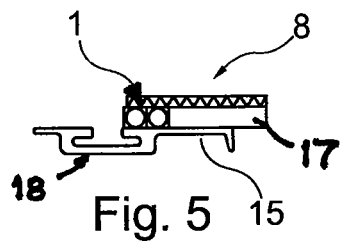
FIG. 5 shows a schematic view of one configuration of the raceway according to an embodiment.

FIG. 5 shows a raceway 1 that is fixed on the fuselage floor 15, adjacent to a seat track 18. As shown in FIG. 5, the raceway 1 may be designed such that covering means 8, such as carpets, cover the raceway 1, increasing the comfort for the passengers and protecting the cables. Fuselage flooring 17 may be form-closed to the raceway 1 such that the raceway 1 is embedded by the floor 15, the flooring 17 and the carpet 8, for example.

Figure 6:
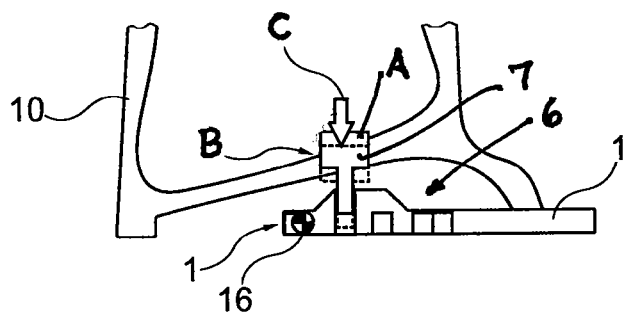
FIG. 6 shows a schematic view of a connection system according to an embodiment.

FIG. 6 shows a schematic view of a connection system. A portion of the seat 10 is illustrated that is connected via the element 6 with the cables 5. The seat 10 and the raceway outlet element 6 may be placed in the preferred position measured from the reference point 16. Then, a second connection means 13 at the seat is plugged to the first connection means 12 of the raceway outlet element 6. According to the plug- and play technology, as illustrated schematically in the drawing, the raceway outlet element 6 includes a component that moves in direction C from an open position A to a closed position B, connecting element 6 with a component 7 of the seat 10, as the seat 10 is positioned into place on the seat track 18.

Figure 7:
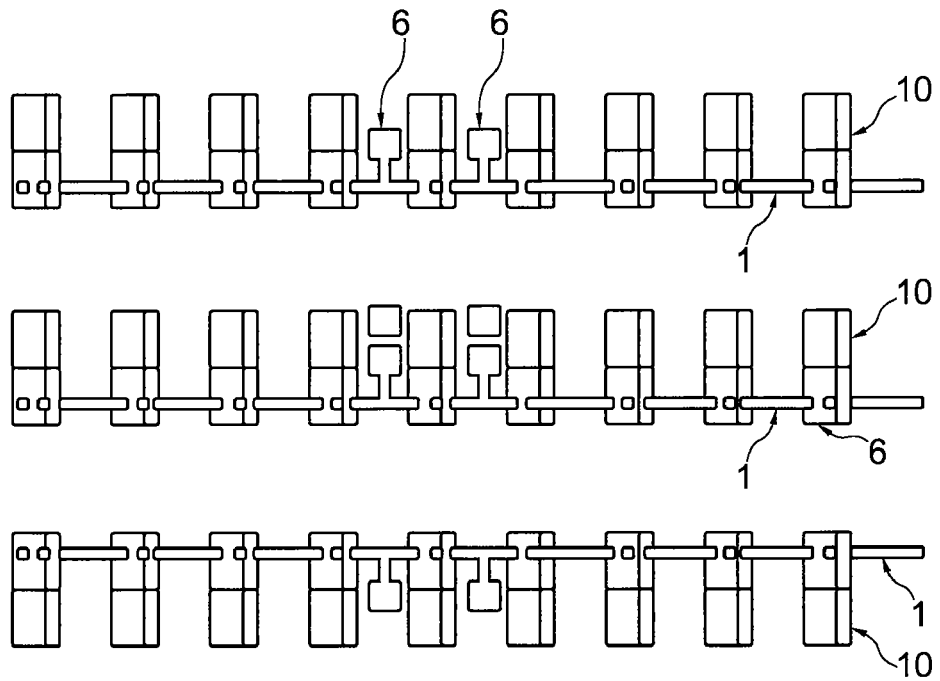
FIG. 7 shows a schematic view of aircraft seat configuration for business class including the connection system according to one example.
Figure 8:
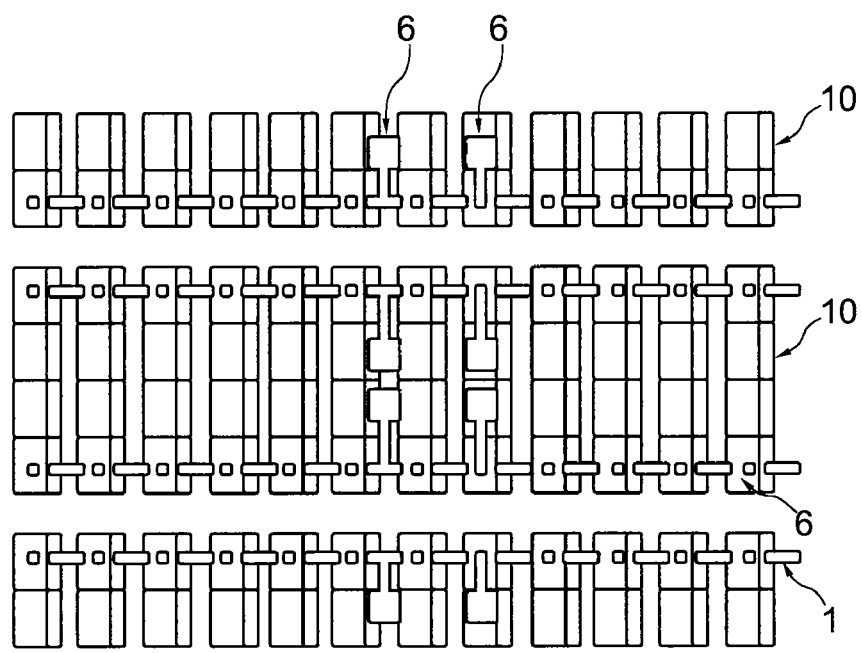
FIG. 8 shows a schematic view of passenger seat configuration for economy class including the connection system in one example.

FIGS. 7 and 8 illustrates an example of the flexibility of a connection system. In FIG. 7, cabin layouts for the business class may be shown, wherein the seat rows may be spaced, for instance, 60 inches from one another to receive a high comfort for the passengers. For each seat 10, raceway outlet elements 6 may be provided to connect the seats 10 with all necessary data and power cables 5.

As shown in FIG. 8, for a cabin layout for the economy class, each passenger seat row is spaced just 30 inches from each other so that the raceway outlet elements 6 have also to be spaced 30 inches in order to connect the passenger seats 10 with the necessary power and data cables 5.

By using a connecting system according to the examples, the reconfiguration between business class and economy class may be handled very quickly because each seat 10 may be connected to the necessary cables 5 easily, for example.

Figure 9:
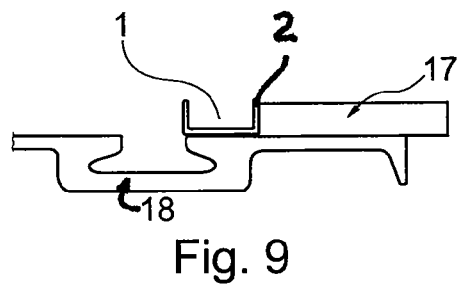
FIG. 9 shows a schematic view of deadphase insert according to an embodiment.

In FIG. 9, a configuration of the raceway 1 is illustrated, showing the bottom. There, the part 2 is routed close besides the seat track 18. The fuselage flooring 17 may be form-closed to the raceway 1, such that the raceway is inserted between the flooring 17 and the seat track 18 without creating unwanted splits or edges etc.

Figure 10:
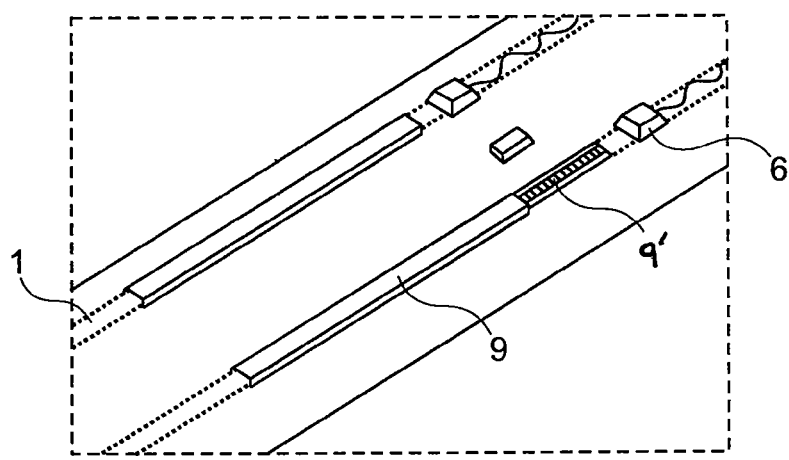
FIG. 10 shows a schematic view of the raceway and the raceway outlet element configured on the aircraft floor according to an embodiment.

FIG. 10 shows an adjustable raceway 1 that is fixed on the floor of a fuselage. The upper part 3 of the raceway 1 includes two parts, wherein these two parts may be relocatable connected so that they may be adjusted to a required length. As shown in FIG. 10, on each end of the raceway 1, a raceway outlet element 6 is fixed on the floor or on the raceway 1 to provide an interface with an electronic device 4, for instance an electronic device 4 installed in a seat 10.

Figure 11:
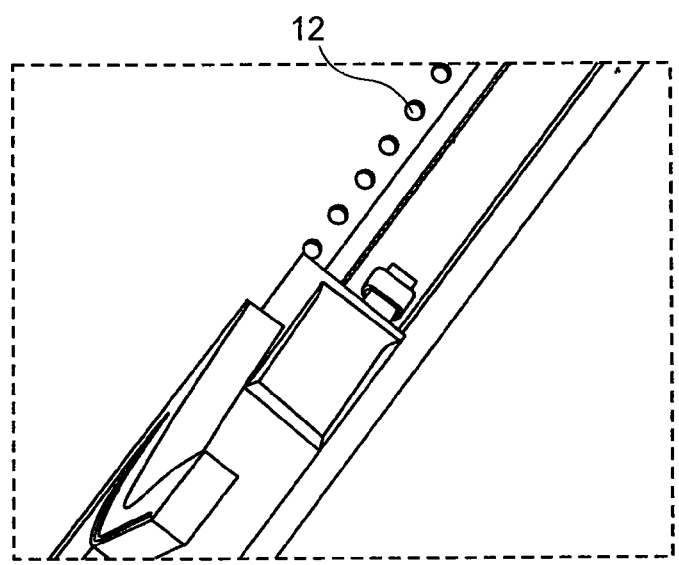
FIG. 11 shows a floor track according to an embodiment.

In FIG. 11 it is shown, that the seat 10 and/or the raceway 1 and/or the raceway outlet elements 6 may be fixed within these track holes 12.

Figure 12:
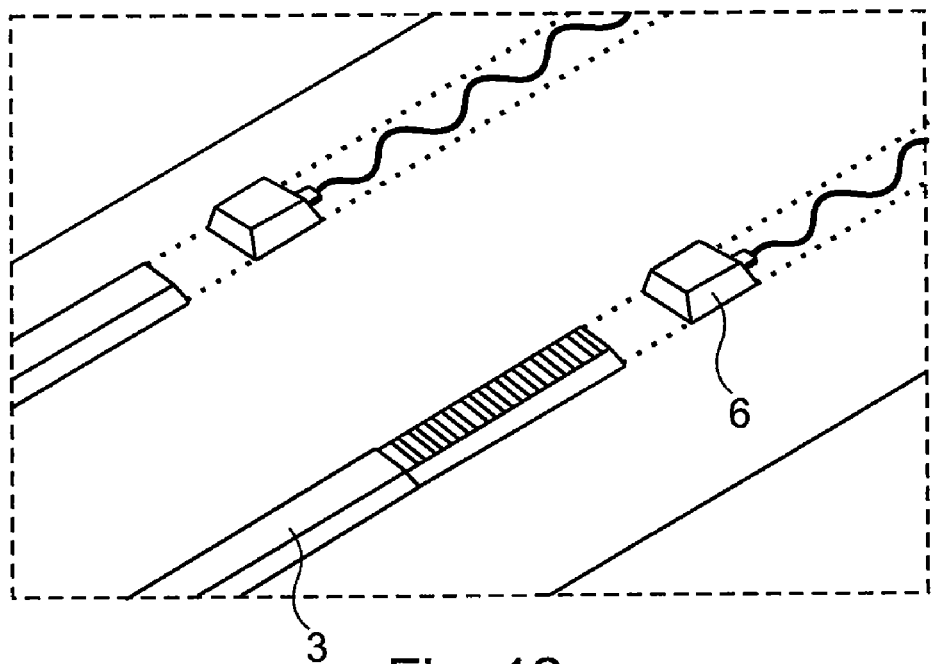
FIG. 12 shows a raceway outlet element including first connection means according to an embodiment.

FIG. 12 shows a plugging concept comprising a deadphase insert. The deadphase insert covers the different phases that are embedded in the raceway 1, wherein the deadphase insert allows to connect one or more predetermined phases. Therewith, for instance, power connections for each seat may be controlled for providing for all seats for instance the same or a similar power load.

Figure 13:
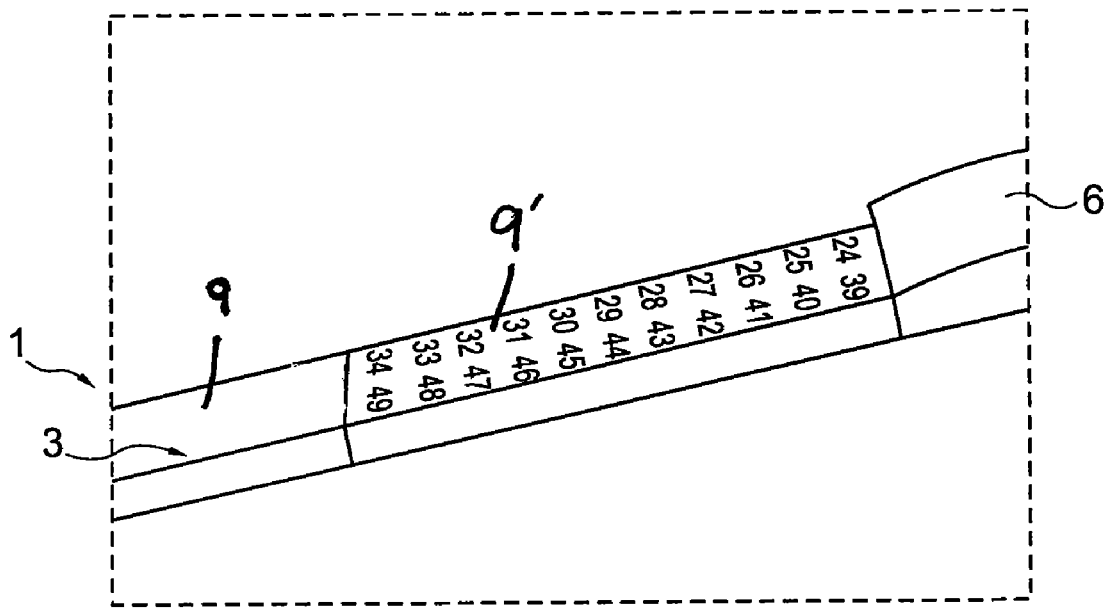
FIG. 13 shows an adjustable raceway including a scale according to an embodiment.

FIG. 13 shows an adjustable raceway 1. The upper part 3 of the raceway comprises two parts, wherein one part includes a scale for adjusting a defined position. Moreover, a raceway outlet element 6 is shown that may be placed for instance on the right end side. The raceway parts 3 may be moved telescopically.

Figure 14:
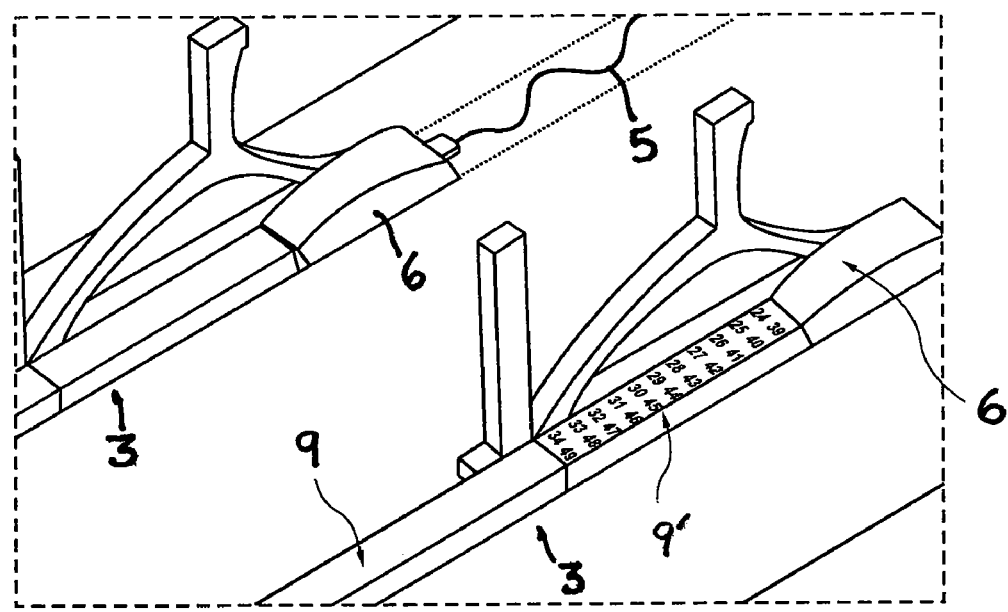
FIG. 14 shows a connection system according to an embodiment.

FIG. 14 shows a connection system according to one example wherein the raceway 1, particularly the upper part 3 of the raceway 1, is equipped with a scale so that a determined position may be adjusted easily. It is shown that on each end of the raceway 1, a raceway outlet element 6 is fixed with the floor and builds an interface with an electronic device 4.

Figure 15:
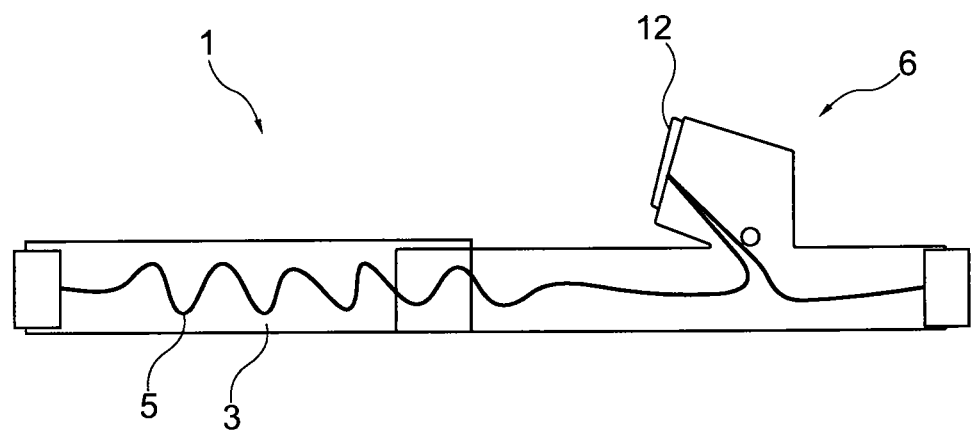
FIG. 15 to FIG. 21 show schematic views illustrating a method of connecting the first and the second connecting means according to an embodiment.

FIG. 15 to FIG. 21 show the method of connecting the cables with the electronic devices according to one example. In FIG. 15, the raceway 1 is shown with its upper part 3 wherein a cable 5 is embedded. On the right end, a raceway outlet element 6 is connected to the raceway 1. The raceway outlet element 6 may be equipped with the first connection means 12 with which several second connection means 13 may be connected.

FIG. 15 illustrates a schematic view of an embodiment comprising a raceway 1 receiving a cable 5 and a raceway outlet element 6 including a first connecting means 12.

Figure 16:
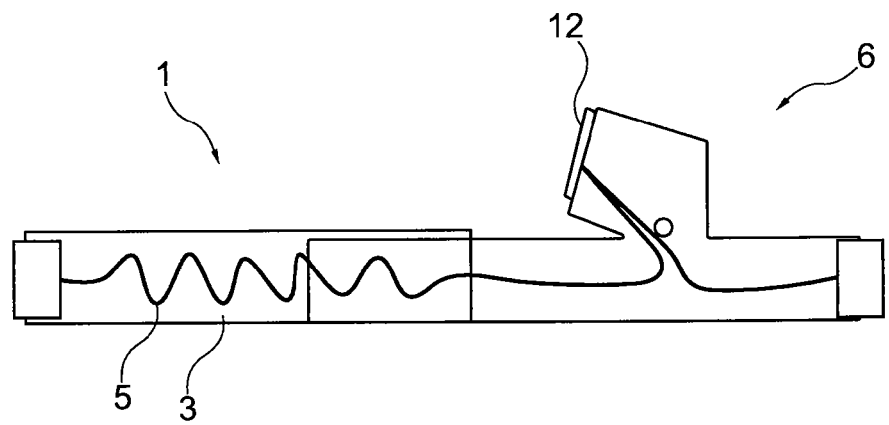

FIG. 16 points out the flexible connection between the raceway 1 and the raceway outlet element 6.

Figure 17:
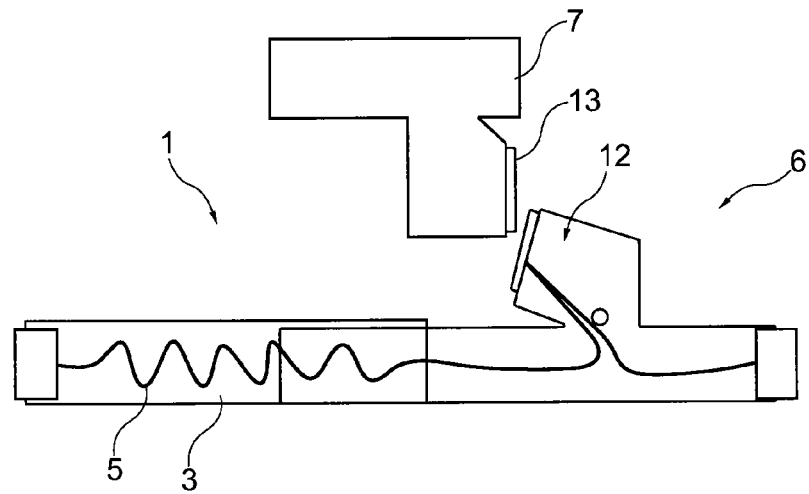
Figure 18:
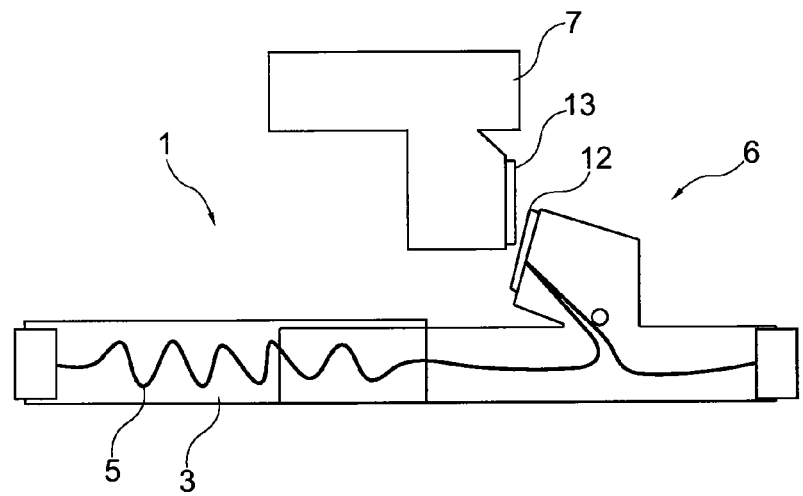
Figure 19:
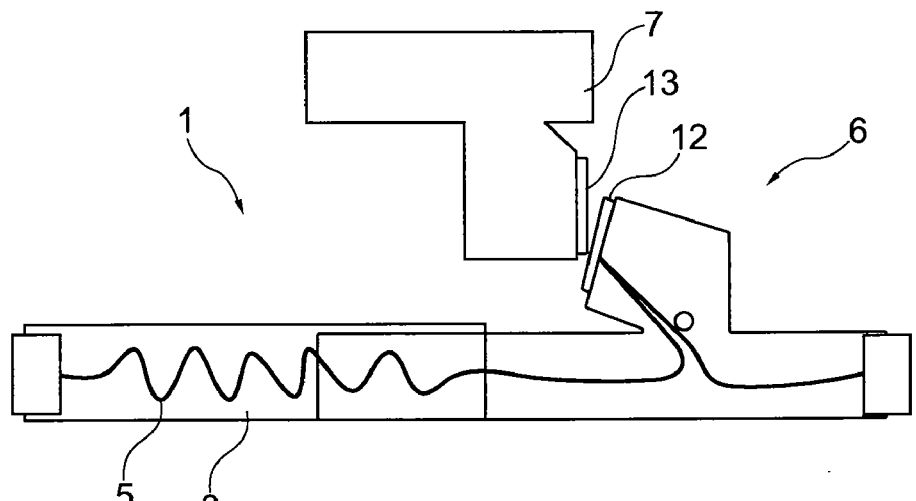
Figure 20:
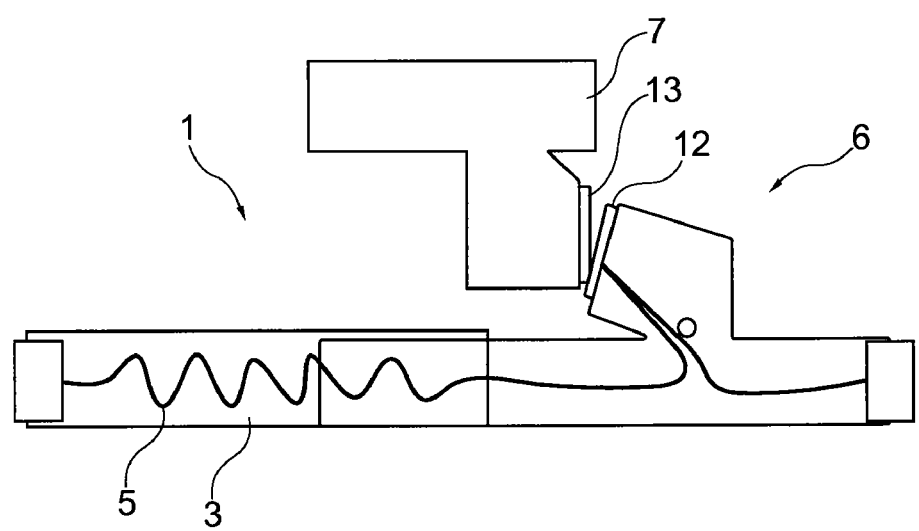
Figure 21:
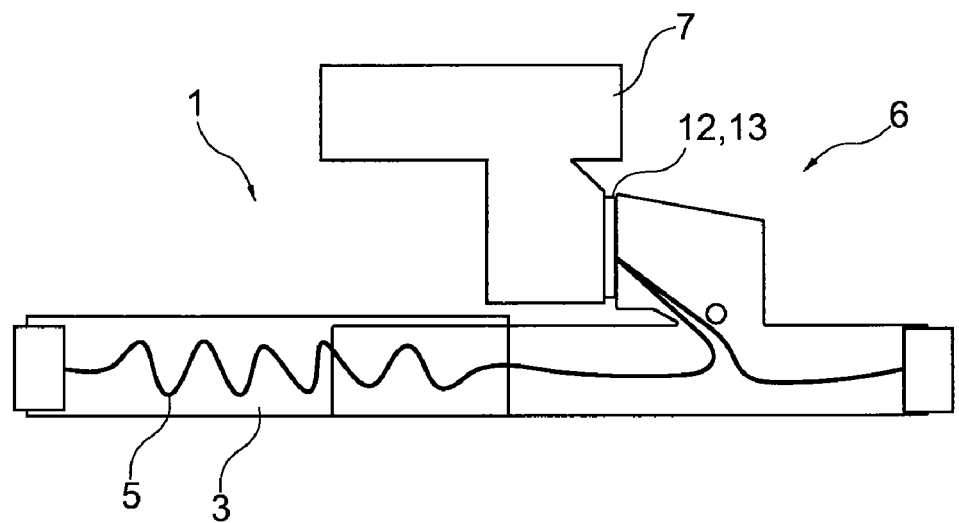

FIG. 17 illustrates an example of a seat component 7 being placed into position as part of a seat 10, after positioning of predetermined length of the connecting system. A second connecting means 13 may be installed by positioning the component 7. In FIG. 18 to FIG. 21 it is shown that the connection system according to the one example may provides a very comfortable and easy way of connecting the first 12 and second 13 connecting means by using plug- and play techniques.

A connection device, comprising a raceway outlet element 6 connectable to a raceway 1 for connecting cables 5 to electronic devices in, for example 6, a seat 10, may include more than one connection element for connecting to more than one of the cables 5. The raceway outlet element 6 may comprise a dead phase insert. The additional connection elements and/or dead phase inserts may be connected, before, during or after installation of seat 10. If plug and play, then connection may occur during installation of a seat 10, for example, making the seat installation process easy and flexible when using the length-adjustable raceway 1.

Figure 22:
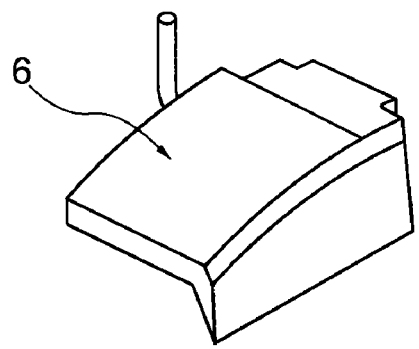
FIG. 22 shows a embodiment of a raceway outlet element.

FIG. 22 shows an embodiment of the raceway outlet element, whereby on the upper surface of the raceway outlet element, for instance, a seat 10, may be connected.

Figure 23:
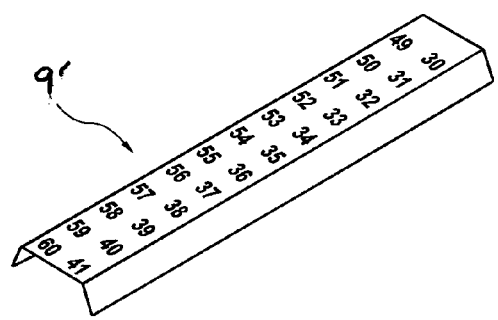
FIG. 23 shows an embodiment of an raceway upper part comprising a scale.

FIG. 23 shows an embodiment of an upper part 3 of a raceway 1, whereby the upper part 3 comprises a scale for adjusting the raceway 1 exactly.

Figure 24:
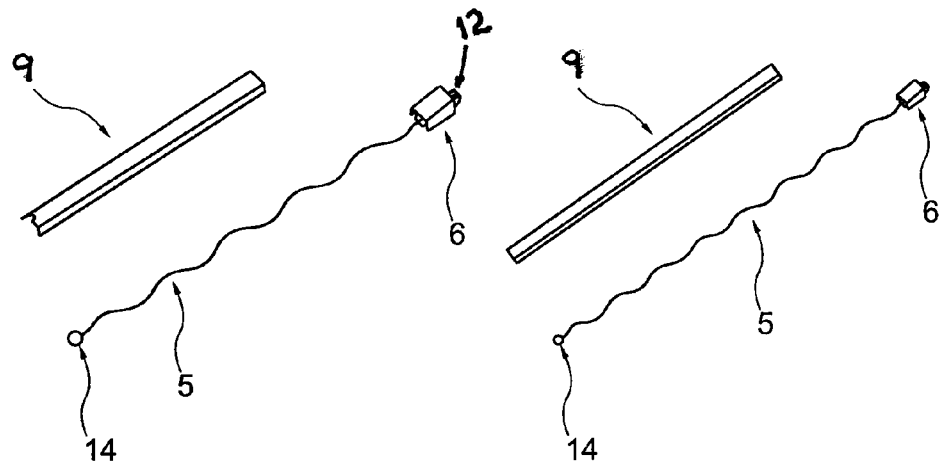
FIG. 24 shows two different set of deliveries according to an embodiment.

FIG. 24 shows two embodiments of a set of delivery including an upper rail 3 and a snake cable 5, whereby the snake cable 5 is connected on one end to a raceway outlet element 6 and includes another end 14 that is connectable to another raceway outlet element 6. Thereby the delivery sets may comprise two different basic lengths of the raceway 1. The left delivery set may be a set for a pitch from 30-45 inches (i.e. economy class) and the right delivery set may be a set for a pitch from 45-60 inches (i.e. business class).

Figure 25:
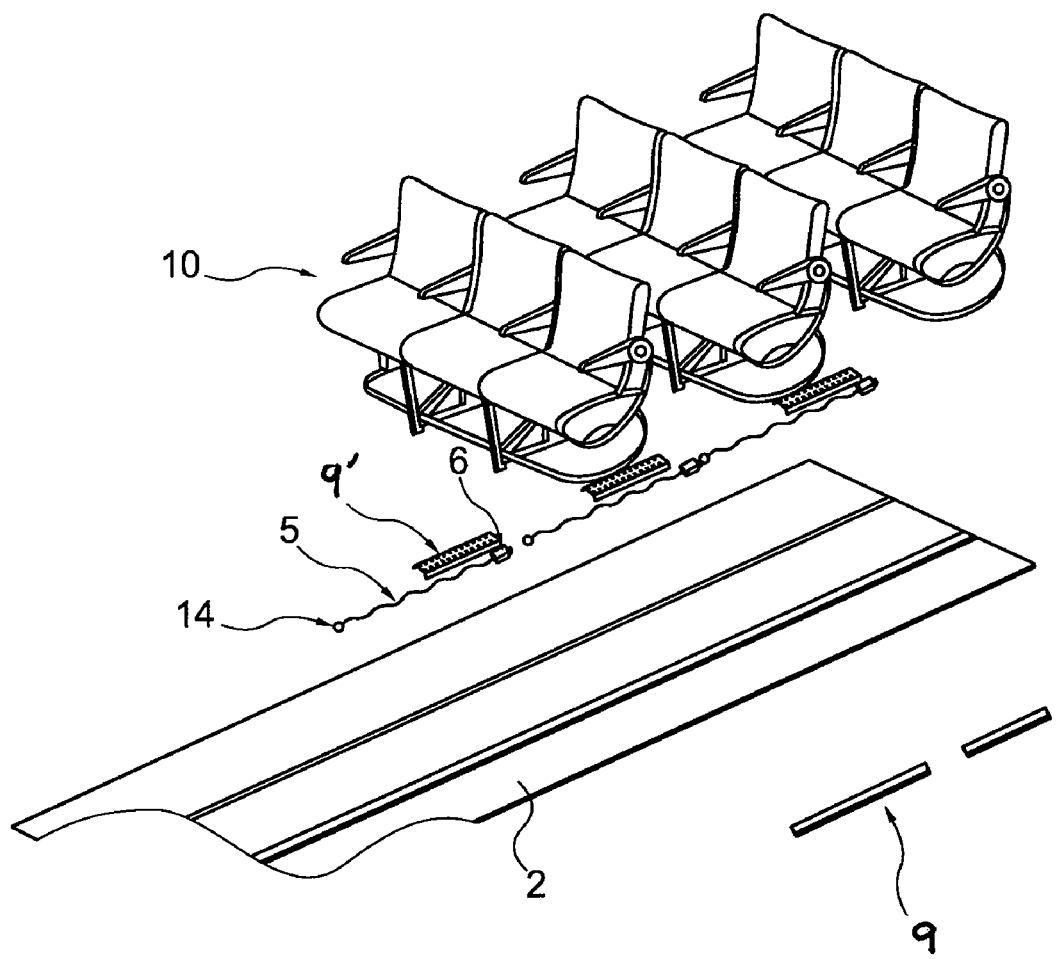
FIG. 25 shows an exploded view by using the connection device according to one example.

FIG. 25 shows an exploded view of one embodiment of the connection device for connecting aircraft seats 10. On the aircraft floor an in the floor embedded bottom part 2 is shown, wherein the cables 5 may be received. The cables 5 are connected to an raceway outlet element 6 that is also fixed to the rail 2. The first seat may be installed just by placing the seat 10 including a second connection means 13 over the raceway outlet element 6. Thereby, the electronic and data cables will be connected automatically by the plug and play concept, in one example and the press-self cleaning connector. The position of the raceway outlet element may be adjusted and therewith, the connection position of the sets 10. As shown, one upper part 3 of a raceway 1 comprises a scale with which a specific position may be adjusted.

After placing the first seat element 10, further seat elements 10 may be placed. Therewith a second cable 5 may be connected to the already placed first raceway outlet element 6 and to a second raceway outlet element 6. (Again, an upper part 3 of the raceway 1 covers the bottom part 2 of the raceway 1 including the cables 5.) This process may be repeated for any desired amount of seats rows 10.

Figure 26:
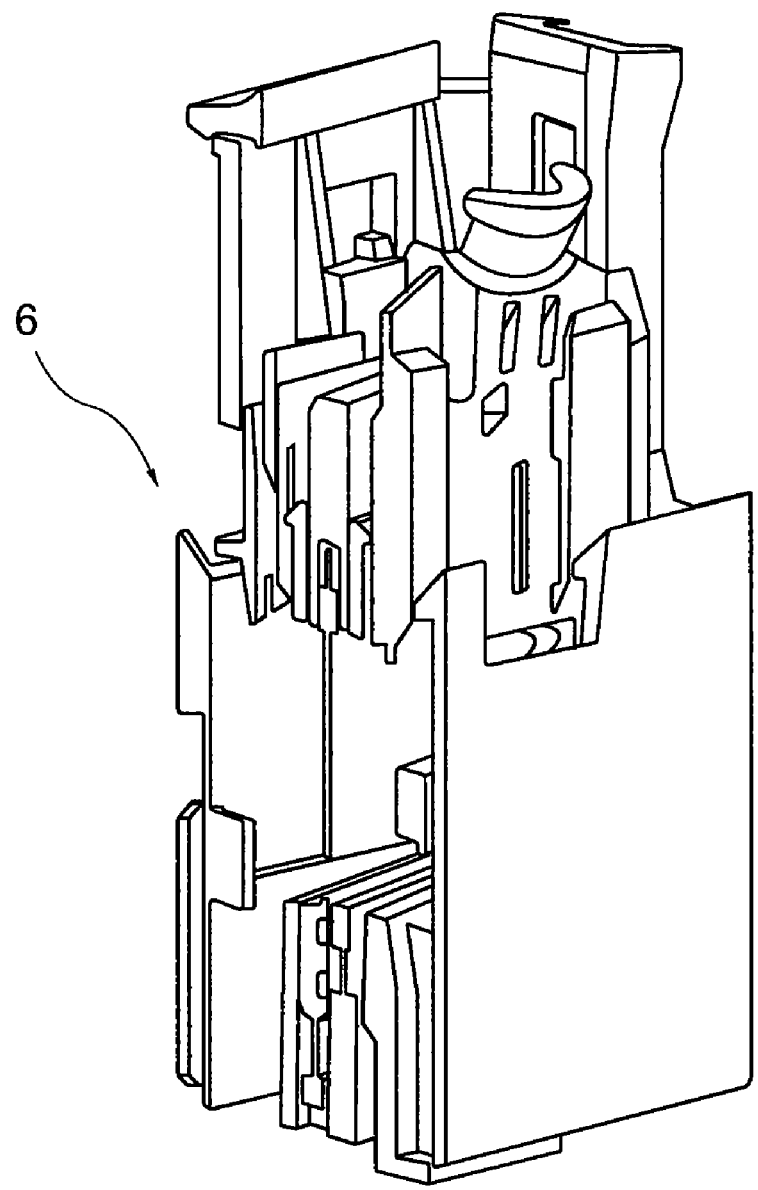
FIG. 26 shows a preferred embodiment of a raceway outlet element according to an embodiment.

FIG. 26 shows an detailed view of preferred embodiment of an raceway outlet element 6. It is illustrated, that at least two cables may be connected by an additional third connection, for instance, for connecting the element 6 to a seat 10.

Figure 27:
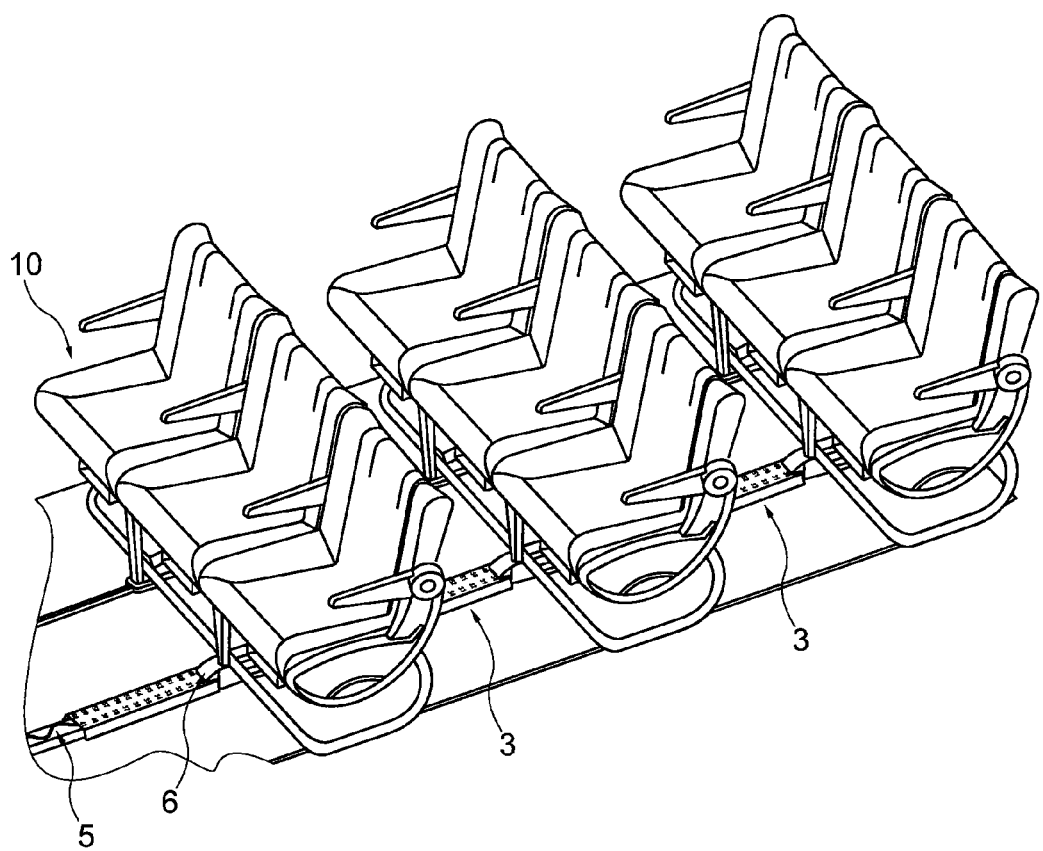
FIG. 27 shows a installed connection device according to an embodiment.

FIG. 27 shows an installed seat configuration 10 by using the connection device in one example. After the first installation description in FIG. 29*a-e*, each seat row 10 may be moved longitudinal in any desired position. The snake cable 5 provides a sufficient cable length and may be equipped with an memory lead for guiding the cable during the reconfiguration of the seats 10.

Figure 28:
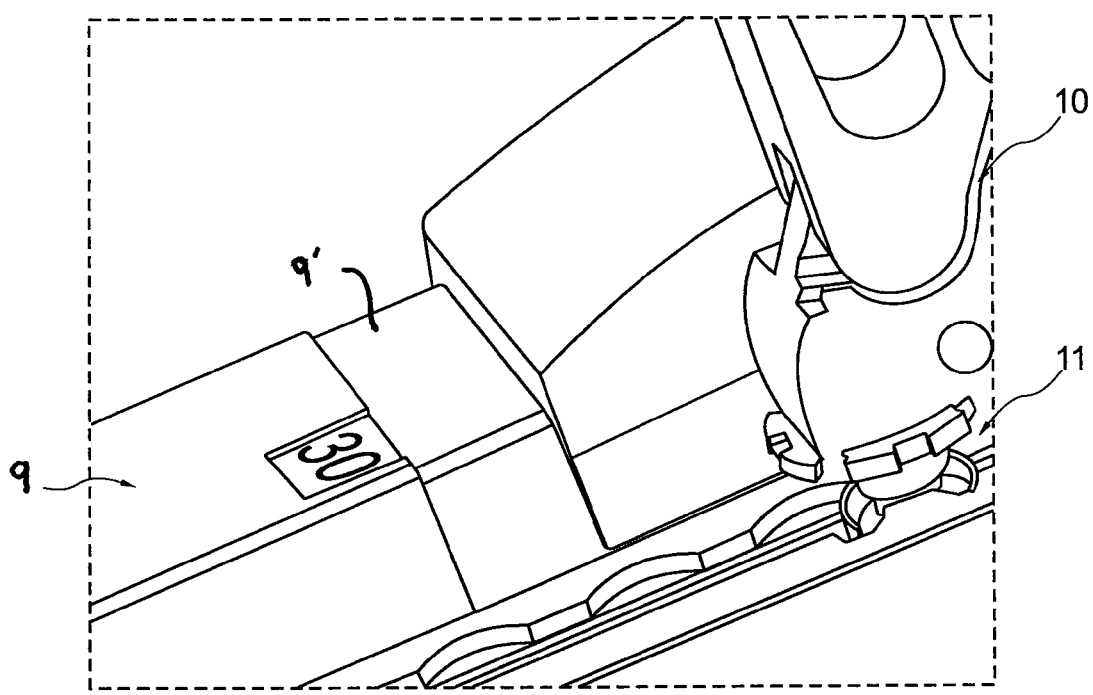
FIG. 28 shows an enlarged view of the connection section according to an embodiment.
Figure 29A:
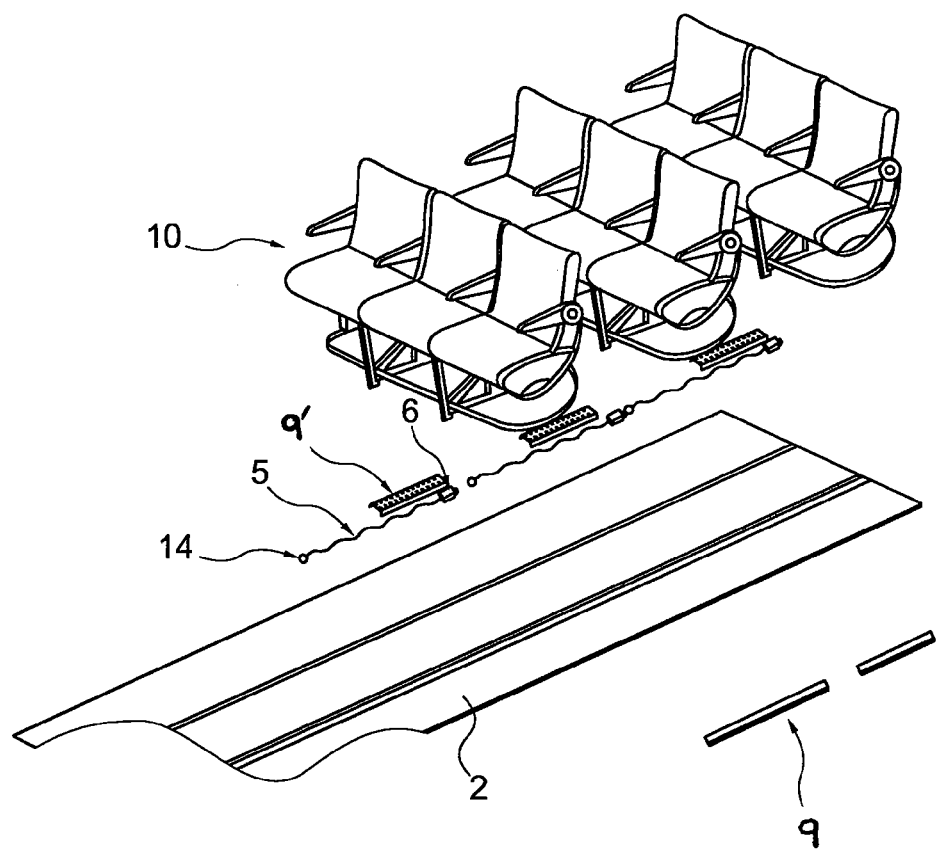
FIG. 29 *a-e* show a procedure for installing aircraft seats with the connection device according to an embodiment
Figure 29B:
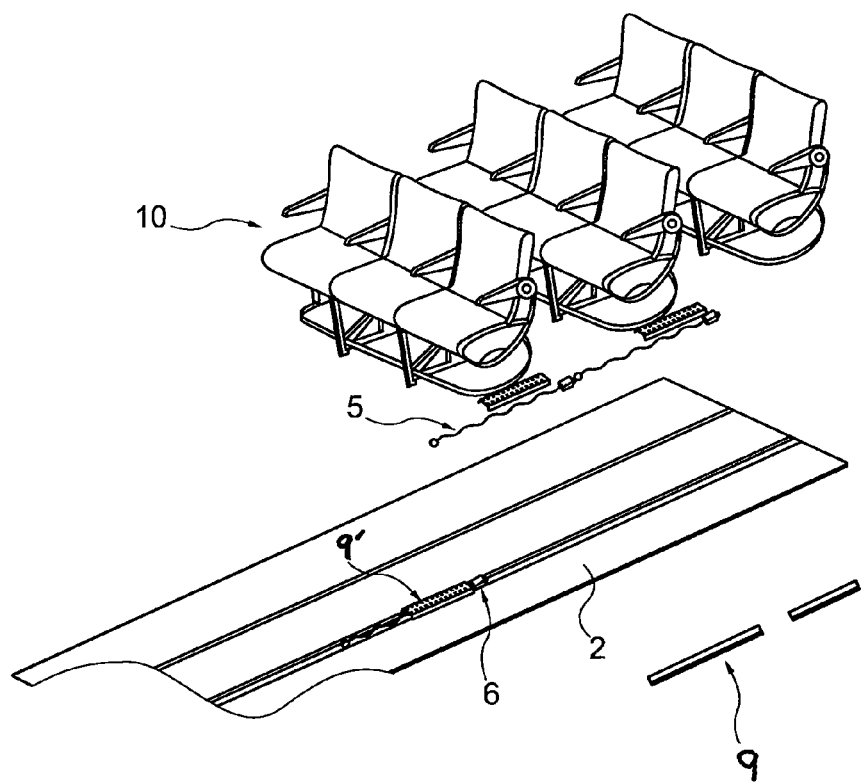
Figure 29C:
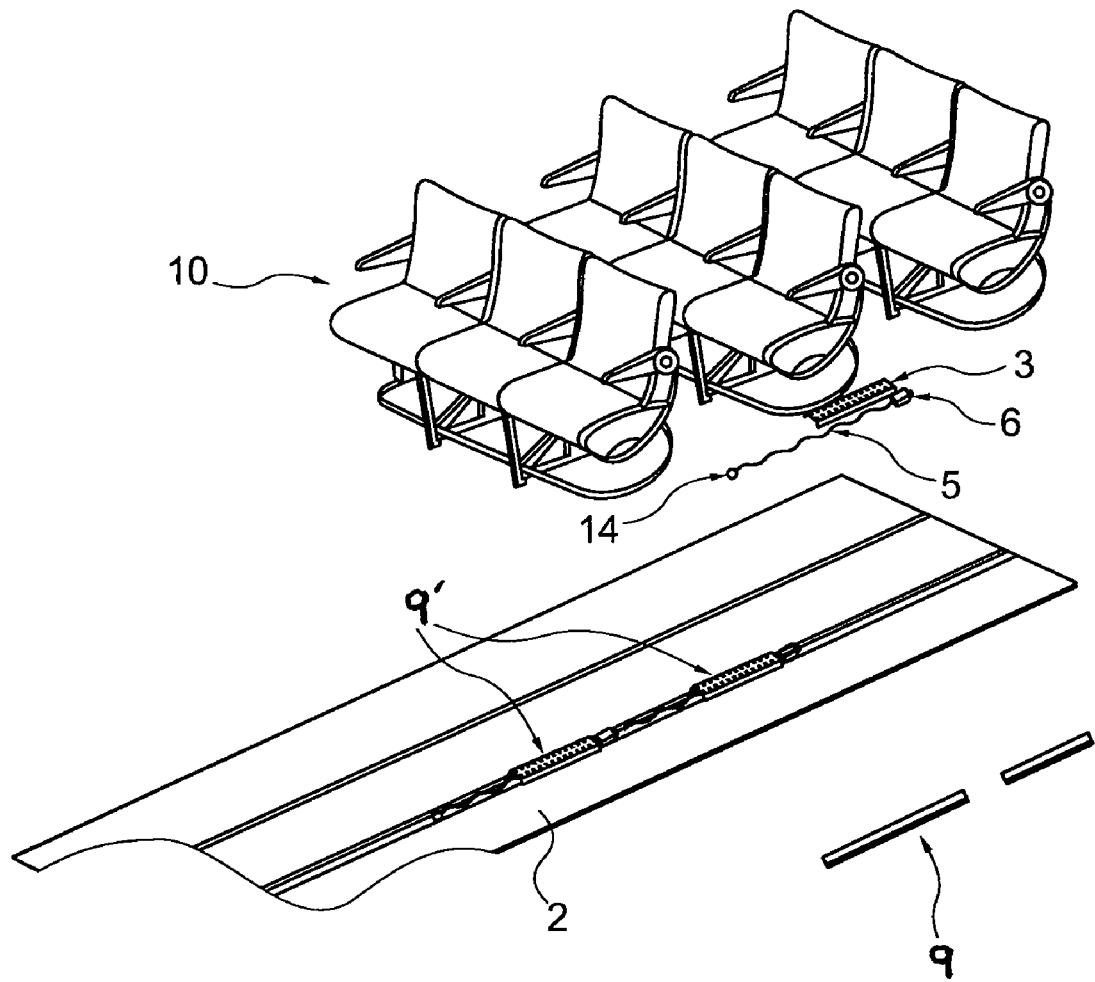
Figure 29D:
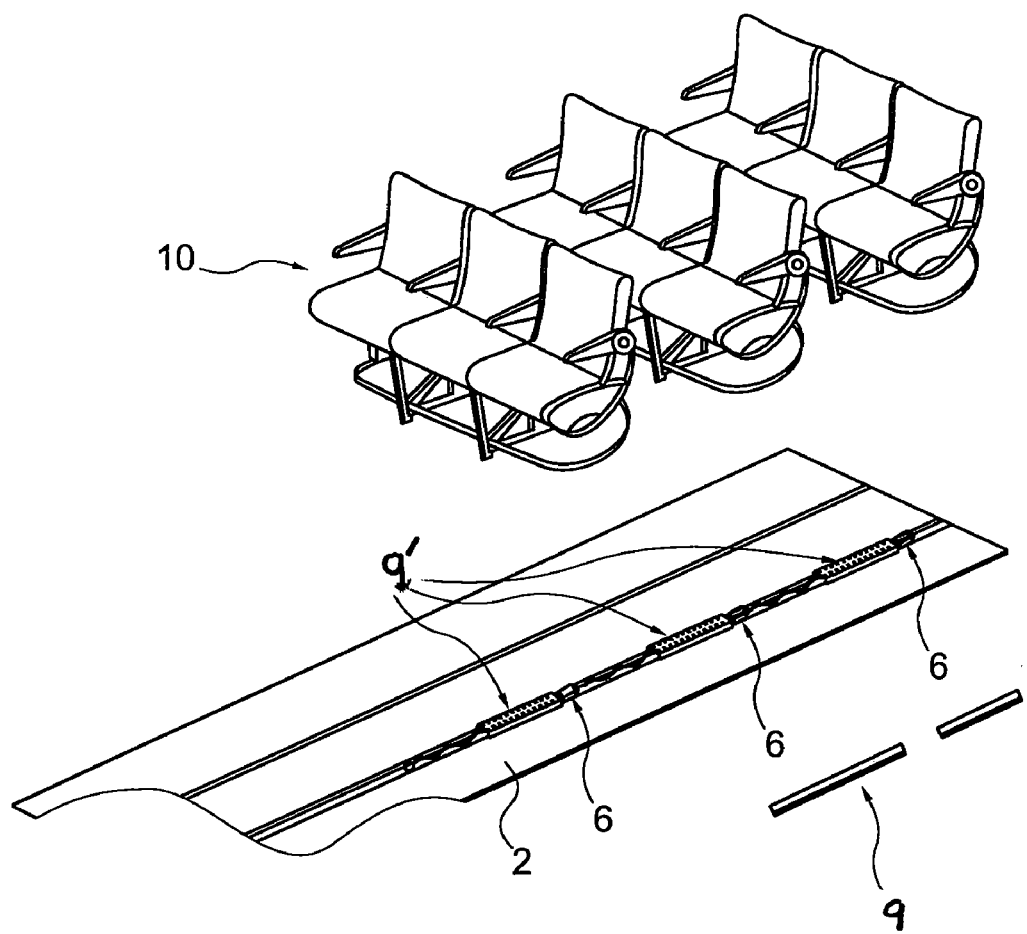
Figure 29E:
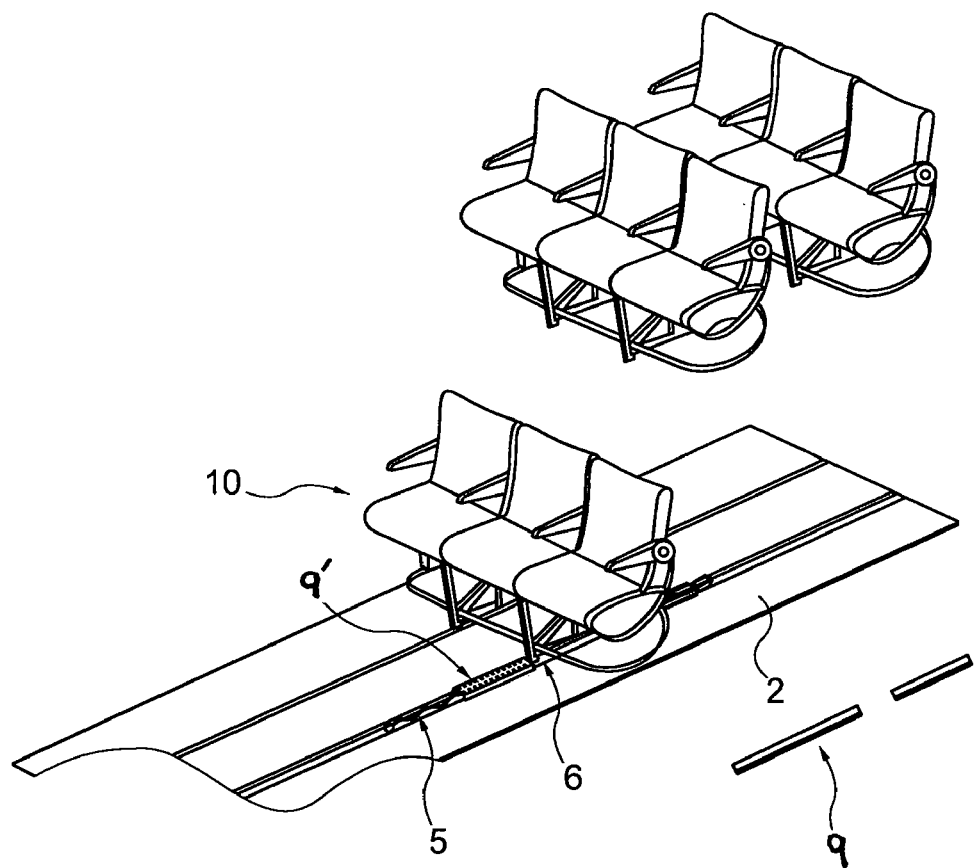

FIG. 28 shows an enlarged view of the connection section. The floor track holes 11 are shown, wherein the connection system and the seats 10 may be fixed.

FIG. 29 (*a*)-(*e*) show a method of installing the seats 10 with the connection device according to one example for the first time. After installing one seat row, a further seat row may be placed and be interconnected with the seat and a front and back seat row 10. Every desirable amount of seat rows 10 and any desirable space between the seat rows 10 may occur. After placing and connecting the seat rows for the first time, each seat row 10 may be moved longitudinally in any desired position.

Figure 30:
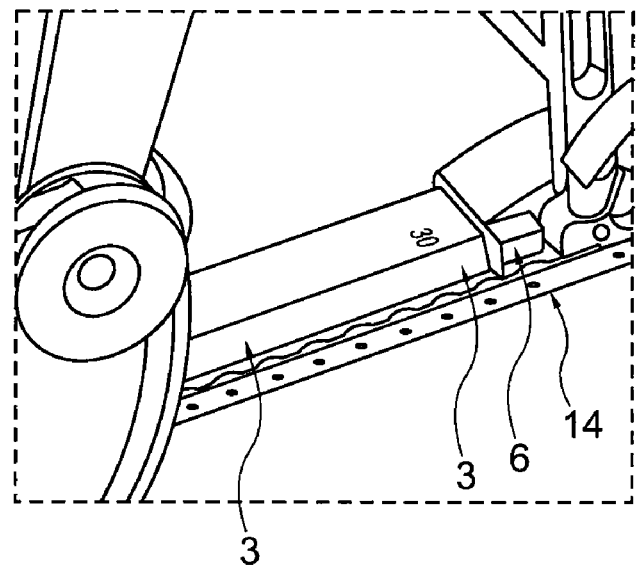
FIG. 30 shows a detailed view of the connection section according to one embodiment
Figure 30:
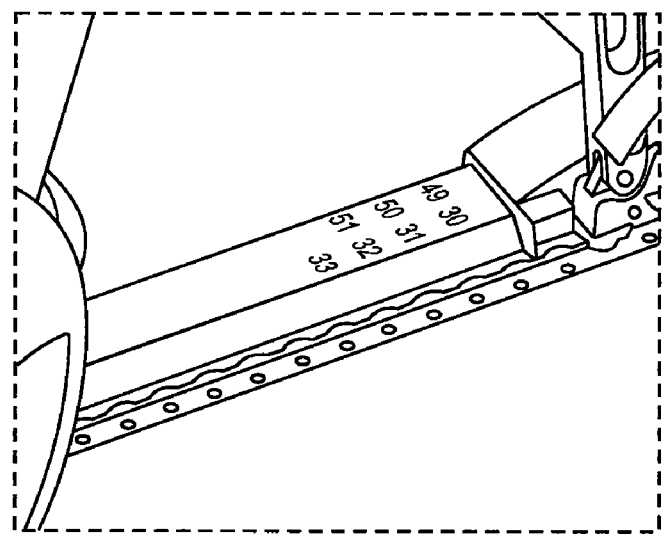

FIG. 30 shows a detailed view of a connection section, wherein it is shown that one first upper part 3 comprises a scale and another upper part 3 is slidably connected to the first upper part 3 and may be moved telescopically on it. By using the scale, each seat row 10 may be position exactly without requiring further measuring means.

It should also be noted that reference signs in the claims shall not be construed as limiting the scope of the claims.

It should be noted that the term "comprising" does not exclude other elements or steps and the "a" or "an" does not exclude a plurality. Also elements described in association with different embodiments may be combined.

Alternative combinations and variations of the examples provided will become apparent based on this disclosure. It is not possible to provided specific examples for all of the many possible combinations and variations of the embodiments described, but such combinations and variations may be claims that eventually issue.

What is claimed is:

1. A means for transportation comprising:
   a cabin floor;
   a seat track; and
   a connection device, the connection device comprising:
      a raceway for receiving cables, the raceway defining a space for receiving the cables within an upper part of the raceway and a bottom part of the raceway, the raceway having a length, and the length of the raceway being slidingly adjustable by sliding the upper part of the raceway on the bottom part of the raceway;
      a raceway outlet element connected to the upper part of the raceway, and the raceway outlet element includes a first connection element for connecting a cable to a second connection element which is designed to correspond to the first connection element, wherein the bottom part of the raceway is connected with the floor and is arranged beside and outside the seat track.

2. The means for transportation according to claim 1, wherein the upper part is connectable to the bottom part, wherein the cables are guidable through the upper part and the bottom part.

3. The means for transportation according to claim 2, wherein the upper part comprises at least two parts which are moveable telescopically.

4. The means for transportation according to claim 2, wherein the upper part or the bottom part or a combination of the upper part and the bottom part includes a scale for adjusting a defined length.

5. The means for transportation according to claim 1, wherein the second connection element is integrated in a seat, substantially in a seat leg.

6. The means for transportation according to claim 1, wherein the raceway the raceway outlet element, or a combination thereof, is covered by a covering element.

7. The means for transportation according to claim 1, wherein the cables are selected from the group consisting of electronic cables, power cables, data cables, optical fibers and light conductors.

8. The means for transportation according to claim 1, wherein the first and second connection elements include a press-self-cleaning connection.

9. The means for transportation according to claim 1, wherein the raceway outlet element comprises an induction connector.

10. The means for transportation according to claim 1, wherein the raceway and the raceway outlet element are integrally formed.

11. The means for transportation according to claim wherein the length of the raceway is adjustable automatically.

12. A method for connecting cables in a means for transportation of claim 1, wherein the method comprises the following steps:
    providing the connection device;
    installing the raceway of the connection device to receive the cables on the floor of the means for transportation and beside the seat track with the bottom part of the raceway beside and outside the seat rack,
    slidingly adjusting a length of the upper part of the raceway on the bottom part of the raceway, whereby the length of the raceway defines the space for receiving the cables within the upper part of the raceway and the bottom part of the raceway, such that the length of the raceway is adjusted;
    connecting a first connection element of a raceway outlet element with the raceway and to a second connection element which is designed to correspond to the first connection element, wherein the first connection element is connected to at least one of the cables, whereby the first connection element and the second connection element are electrically coupled.

13. The method according to claim 12, wherein the step of installing a raceway includes the steps of:
    connecting the bottom part of the raceway to the floor,
    embedding the cables in the raceway bottom part, and connecting the upper part of the raceway to the bottom part of the raceway, such that the cables are embedded between the upper part and the bottom part of the raceway.

14. The method according to claim 12, wherein the step of connecting the first connection element and the second connection element automatically couples the first connection element and the second connection element electrically when the second connection element is incorporated with an installation and the installation is disposed onto the first connection element during a step of installing the installation.

15. The method according to claim 14, wherein the installation includes a seat and the step of installing the installation further comprises integrating the second connection element in the seat such that the first connection element and the second connection element are connected and electrically coupled, automatically, during the step of installing the installation.

16. The method according to claim 15, wherein the step of installing the installation includes using a press-self-cleaning connection for connecting the first connection element and the second connection element.

17. The method according to claim 12, wherein the method comprises a further step of covering the raceway or the raceway outlet element or a combination thereof by covering elements.

18. A means for transportation comprising a transport system according to claim 1, wherein the means for transportation is an aircraft.

19. A means for transportation, comprising a transport system according to claim 1 including a seat, wherein the second connection element which is designed to correspond to the first connection element is connected with the seat and electrically couples the first connection element and the seat.

* * * * *